DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 30, 1971

892 O.G. 1604

T892,020

METHOD FOR VARYING THE CONTRAST OF DUPLICATE RADIOGRAPHS

Leland Erickson, Kodak Park Works, Rochester, N.Y. 14650

Filed Feb. 2, 1970, Ser. No. 8,027

Int. Cl. G03b *41/16*

U.S. Cl. 355—132

No Drawing. 9 Pages Specification

A method of adjusting the contrast of copies of radiographs to permit successful rendition of the original radiograph is described. According to the present method there is provided exposure of a direct-positive photosensitive element having at least two photosensitive layers separated by a filter layer to a light source selected for its wavelength distribution. The contrast control which characterizes the method of the present invention is readily achieved by utilizing the above-described photographic element and exposing the element through a radiographic master with a light source selected for its wavelength emission. By properly selecting the characteristics of said photographic element and by selecting an appropriate spectrum of exposing light, it is possible to produce a duplicating film having a gamma of unity and maximum density greater than 3.0 which can render a faithful copy of a radiograph containing densities greater than 3.0.